No. 664,525. Patented Dec. 25, 1900.
S. BLAGDEN.
FINGER BOWL.
(Application filed Sept. 5, 1900.)

(No Model.)

Witnesses
Silliman Blagden
Inventor

UNITED STATES PATENT OFFICE.

SILLIMAN BLAGDEN, OF BOSTON, MASSACHUSETTS.

FINGER-BOWL.

SPECIFICATION forming part of Letters Patent No. 664,525, dated December 25, 1900.

Application filed September 5, 1900. Serial No. 29,039. (No model.)

*To all whom it may concern:*

Be it known that I, SILLIMAN BLAGDEN, a citizen of the United States, and a resident of Boston, in the county of Suffolk and State of Massachusetts, have invented a certain new and useful Improved Finger-Bowl, of which the following is a specification.

This invention relates to an improvement in finger-bowls whereby the user may observe whether the face is soiled by food and in the case of men whether there is food adhering to the mustache or beard.

This invention is carried out by so constructing a finger-bowl that the user may see in the finger-bowl the reflection of so much of the face, mustache, or beard as to ascertain whether food is adhering thereto and thereupon remove it. By this means the face, mustache, or beard may be kept clean while eating and the unconscious unsightly appearance of food clinging to the face, mustache, or beard avoided.

The invention consists in a finger-bowl constructed as hereinafter set forth and claimed.

Figure 1:
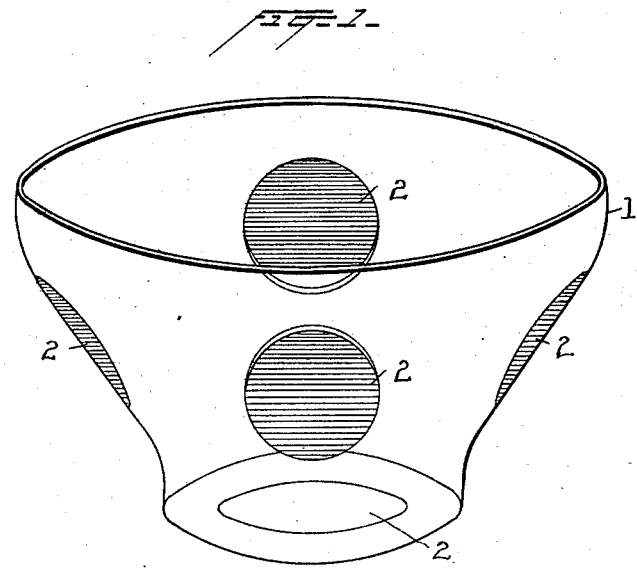
Figure 2:
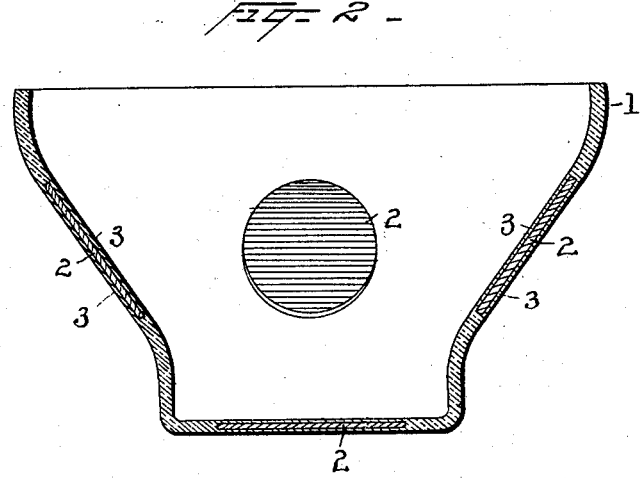

Referring to the accompanying drawings, Figure 1 is a perspective view of a finger-bowl, illustrating the invention. Fig. 2 is a vertical section thereof.

1 indicates a finger-bowl, which may be of any suitable shape, the invention not being limited to the form and shape shown.

The bowl 1 is provided with a number of mirrors 2, located in its sides and bottom. The bowl 1 is formed in a mold which forms indentations in the glass of the bowl where the mirrors are to be located. The mirrors are then placed and held in the indentations and permanently secured in place by blowing glass over them, so as to shut them in and hermetically seal them, but so that they will still reflect perfectly well through the enveloping covering 3 of glass. The mirrors 2 may reflect on both sides of the bowl, if desired, or only on the inside.

The sides of the bowl are preferably formed at such an angle—as, for example, that shown—as to place the mirrors in a convenient position for the observer to readily see himself. In addition to the advantages hereinbefore set forth of a finger-bowl so constructed the mirrors give a highly ornamental effect to the bowl.

Having described my invention, I claim—

1. As a new article of manufacture, a finger-bowl constructed with a number of mirrors embedded therein and covered with glass, as herein set forth.

2. As a new article of manufacture, a finger-bowl formed with indentations and provided with mirrors located in said indentations and covered and hermetically sealed with glass blown over said mirrors, as herein set forth.

Signed at Bethlehem, in the county of Grafton and State of New Hampshire, this 29th day of August, A. D. 1900.

SILLIMAN BLAGDEN.

Witnesses:
 BENJAMIN TUCKER,
 F. H. ABBOTT,
 WILLIAM E. EDMONSTON.